I. Cook.
Hoe and Rake.
No. 68,958.      Patented Sep. 17, 1867.
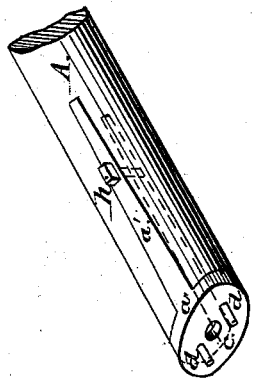
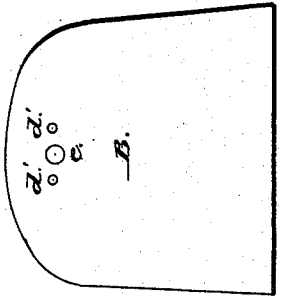
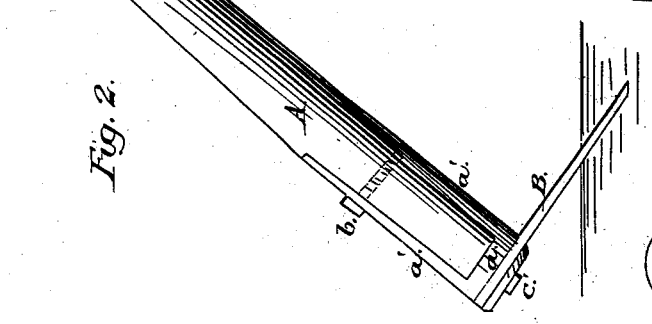
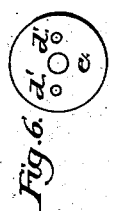
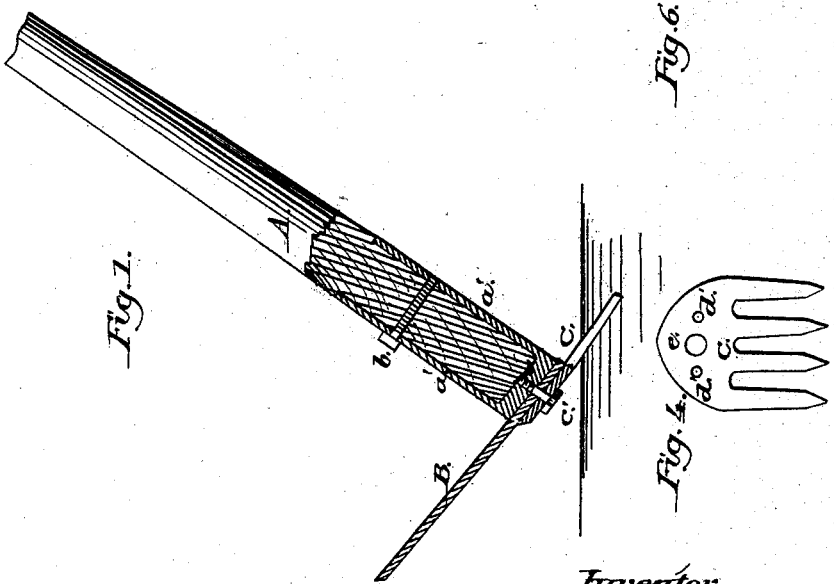
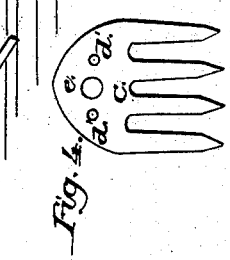
Witnesses:
Theo. Insche
J. Alison Chosen
Inventor:
J. Cook
Per Munn & Co.
Attorneys
N. PETERS, PHOTO-LITHOGRAPHER, WASHINGTON, D. C.

United States Patent Office.

ISAAC COOK, OF HAYNESVILLE, MISSOURI.

Letters Patent No. 68,958, dated September 17, 1867.

IMPROVEMENT IN COMBINED HOE AND RAKE.

*The Schedule referred to in these Letters Patent and making part of the same.*

TO ALL WHOM IT MAY CONCERN:

Be it known that I, ISAAC COOK, of Haynesville, in the county of Clinton, and State of Missouri, have invented a new and improved Combined Hoe and Rake; and I do hereby declare that the following is a full, clear, and exact description thereof, which will enable those skilled in the art to make and use the same, reference being had to the accompanying drawings, forming part of this specification, in which—

Figure 1 represents my improved combined hoe and rake partly in section, showing the connection with the handle.

Figure 2 represents the hoe alone, connected with the handle.

Figure 3 represents the handle detached.

Figure 4 represents the rake detached.

Figure 5 represents the hoe detached.

Figure 6 represents a washer, employed for securing the hoe or rake alone to the handle.

Similar letters of reference indicate corresponding parts.

This invention relates to an improvement in the construction of a combined hoe and rake, and consists in a device for securing them to the handle together or separately, as hereinafter described.

A is a handle of wood, in the head of which is fitted a metal cap, $a$, secured by a screw-bolt, $b$, that passes through two side strips $a'$ $a'$ and the body of the handle. In the middle of the cap $a$ a screw-thread is cut in a hole, $c$, to receive a screw-bolt, $c'$; and on each side of the centre are two pins $d$ $d$, fixed in the cap, and projecting far enough to pass through corresponding holes $d'$ $d'$, made in the plate of a hole, B, as shown clearly in fig. 5, and also in the top plate of a rake, C, as shown clearly in fig. 4. The screw-bolt $c'$ passes through holes $e$ in the hoe and the rake, and secures them firmly to the cap $a$ on the handle A, while the pins $d$ $d$ in the holes $d'$ $d'$ prevent them from turning on the handle. By the same device the hoe or the rake may be secured separately, as well as together, on the handle A by means of a washer, D, fig. 6, which is placed under the head of the bolt $c'$ in the place of either the hoe or the rake.

Having described my invention, I claim as new, and desire to secure by Letters Patent—

The cap $a$, secured by the screw-bolt $b$ to the handle A, through the side strips $a'$ $a'$, for attaching a hoe and rake together or separately, with the screw-bolt $c'$ and the pins $d$ $d$, substantially as herein described.

ISAAC COOK.

Witnesses:
C. H. KELSAY,
G. W. MITCHELL.